US012240001B2

(12) United States Patent
Tuominen et al.

(10) Patent No.: US 12,240,001 B2
(45) Date of Patent: Mar. 4, 2025

(54) FROTH FLOTATION UNIT

(71) Applicant: OUTOTEC (FINLAND) OY, Espoo (FI)

(72) Inventors: Jere Tuominen, Espoo (FI); Rodrigo Grau, Pori (FI); Tatu Miettinen, Helsinki (FI); Zakaria Mönkäre, Helsinki (FI)

(73) Assignee: OUTOTEC (FINLAND) OY, Espoo (FI)

( * ) Notice: Subject to any disclaimer, the term of this patent is extended or adjusted under 35 U.S.C. 154(b) by 893 days.

(21) Appl. No.: 16/628,392

(22) PCT Filed: Jul. 4, 2017

(86) PCT No.: PCT/FI2017/050505
§ 371 (c)(1),
(2) Date: Jan. 3, 2020

(87) PCT Pub. No.: WO2019/008217
PCT Pub. Date: Jan. 10, 2019

(65) Prior Publication Data

US 2020/0215551 A1 Jul. 9, 2020

(51) Int. Cl.
*B03D 1/14* (2006.01)
*B03D 1/02* (2006.01)
*B03D 1/20* (2006.01)

(52) U.S. Cl.
CPC ............. *B03D 1/1406* (2013.01); *B03D 1/02* (2013.01); *B03D 1/1462* (2013.01); *B03D 1/20* (2013.01)

(58) Field of Classification Search
CPC .................................................... B03D 1/1406
See application file for complete search history.

(56) References Cited

U.S. PATENT DOCUMENTS 3,032,199 A 5/1962 Sumiya
5,039,400 A 8/1991 Kallioninen et al.
(Continued)

FOREIGN PATENT DOCUMENTS

WO 2009-115348 A1 9/2009
WO 2019008214 A1 1/2019
WO 2019008215 A1 1/2019

OTHER PUBLICATIONS

Machine translation for WO 2009/115348, Sep. 2009.*
(Continued)

*Primary Examiner* — Peter Keyworth
(74) *Attorney, Agent, or Firm* — Robert P. Michal, Esq.; Carter, DeLuca & Farrell, LLP

(57) ABSTRACT

A froth flotation unit for treating mineral ore particles suspended in slurry includes a tank, a gas supply for introducing flotation gas into the slurry to form froth, and a first froth collection launder including a first froth overflow lip facing towards the centre of the tank. The froth flotation unit has a pulp area of at least 15 $m^2$ measured at a mixing area. The froth flotation unit further includes a second froth collection launder with a first froth overflow lip facing the perimeter of the flotation tank, and a froth blocker arranged between the first froth overflow lip and the second froth overflow lip. A froth flotation line, its use, and a froth flotation method are also disclosed.

40 Claims, 8 Drawing Sheets

(56) References Cited

U.S. PATENT DOCUMENTS

| | | | | |
|---|---|---|---|---|
| 5,251,764 | A | 10/1993 | Niitti et al. | |
| 2008/0149536 | A1* | 6/2008 | Ronkainen ............... | B03D 1/02 209/163 |

OTHER PUBLICATIONS

International Search Report issued by the Finnish Patent and Registration Office acting as the International Searching Authority in relation to International Application No. PCT/FI2017/050505 dated Oct. 30, 2017 (5 pages).

Written Opinion of the International Searching Authority issued by the Finnish Patent and Registration Office acting as the International Searching Authority in relation to International Application No. PCT/FI2017/050505 dated Oct. 30, 2017 (10 pages).

Barbian et al: "The Froth Stability Column: Measuring Froth Stability at an Industrial Scale", Minerals Engineering, Elsevier, Amsterdam, NL, vol. 19, No. 6-8, May 1, 2006 (May 1, 2006), pp. 713-718.

Extended European Search Report issued by the European Patent Office in relation to International Application No. PCT/FI2017/050505 dated Jan. 22, 2021 (9 pages).

Chilean Search Report issued by the Chilean Patent Office in relation to Chilean Application No. 201903876 dated Jan. 11, 2021 (3 pages).

* cited by examiner

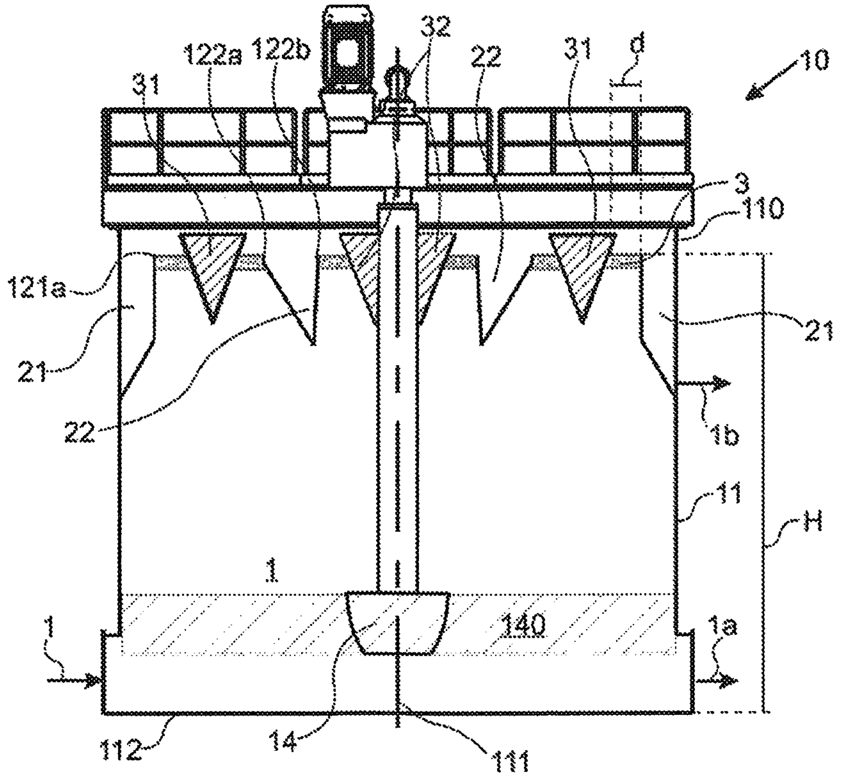
Fig. 2a
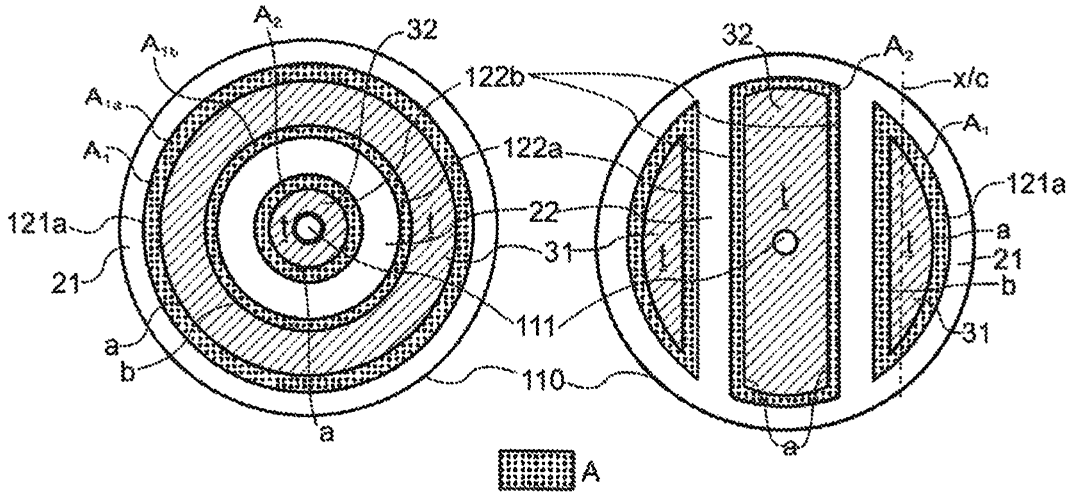
Fig. 2b
Fig. 2c

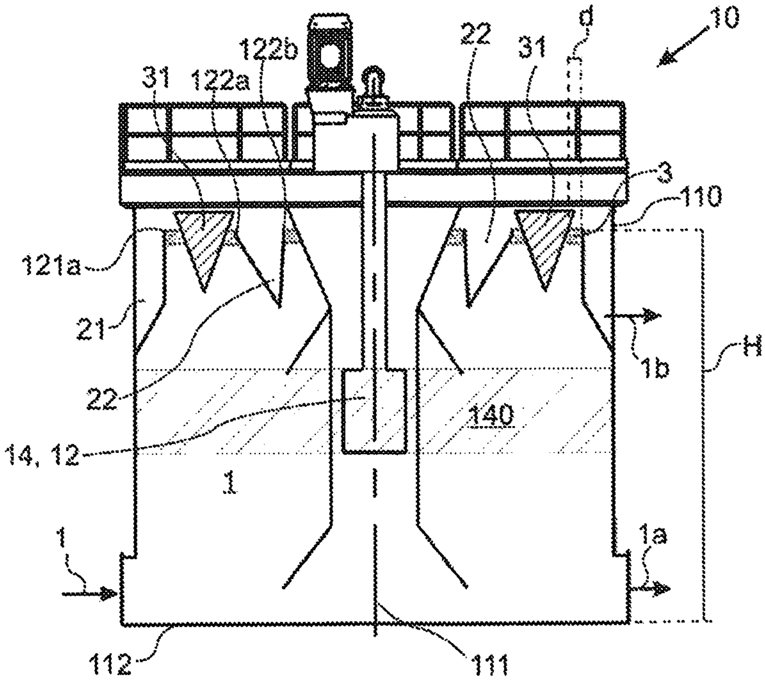
Fig. 4a
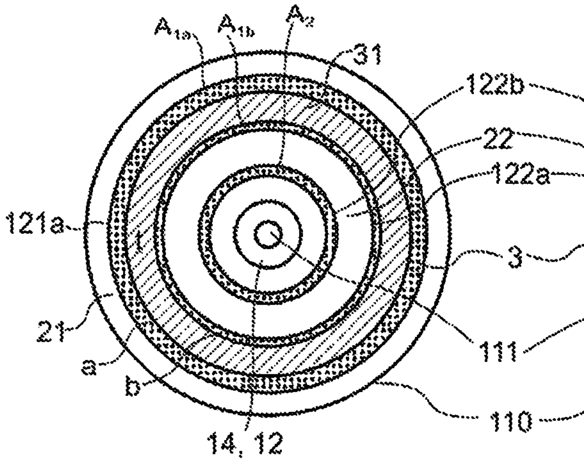
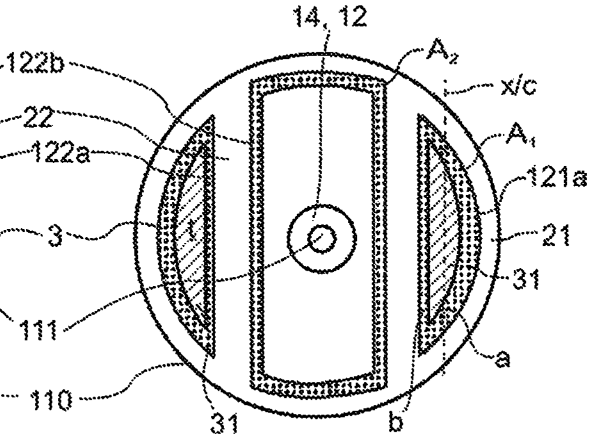
A
Fig. 4b
Fig. 4c

FROTH FLOTATION UNIT

CROSS-REFERENCE TO RELATED APPLICATIONS

This application is a national phase entry under 35 U.S.C. 371 of PCT International Application No. PCT/FI2017/050505 filed Jul. 4, 2017, the disclosure of this application is expressly incorporated herein by reference in its entirety.

FIELD OF THE INVENTION

The present invention relates to a froth flotation unit for treating mineral ore particles suspended in slurry and for separating the slurry into an underflow and an overflow, a froth flotation line, its use and a froth flotation method.

SUMMARY OF THE INVENTION

The unit according to the current disclosure is characterized by what is presented in claim 1.

The flotation line according to the current disclosure is characterized by what is presented in claim 30.

Use of the froth flotation line according to the current disclosure is characterized by what is presented in claim 33.

The froth flotation method according to the current disclosure is characterized by what is presented in claim 36.

A froth flotation unit is provided for recovering valuable metal containing ore particles from ore particles suspended in slurry and for separating the slurry into an underflow and an overflow. The froth flotation unit comprises a tank with a centre and a perimeter, a gas supply for introducing flotation gas into the slurry to form froth, and a first froth collection launder comprising a first froth overflow lip facing towards the centre of the tank. The froth flotation unit has a pulp area of at least 15 $m^2$, measured at a mixing area. The froth flotation unit is characterized in that it further comprises a second froth collection launder arranged inside the first froth collection launder, the second froth collection launder comprising a first froth overflow lip facing the perimeter of the flotation tank. The froth flotation unit further comprises a froth blocker arranged between the first froth overflow lip and the second froth overflow lip.

The flotation line according to the invention comprises at least one froth flotation unit according to the present disclosure.

The use of a froth flotation line according to the present invention is intended to be employed in recovering mineral ore particles comprising a desired mineral.

The froth flotation method for treating mineral ore particles suspended in slurry comprises separating the slurry into an underflow and an overflow in a froth flotation unit according to the present disclosure. The method is characterized in that an open froth surface of a flotation tank is divided into two open froth subsurfaces by a froth blocker arranged between a first overflow lip of a first froth collection launder and a first overflow lip of a second froth collection launder.

By using the invention described herein, it may be possible to direct so-called "brittle froth", i.e. a loosely textured froth layer comprising generally larger flotation gas bubbles agglomerated with the mineral ore particles intended for recovery, more efficiently and reliably towards the forth overflow lip and froth collection launder. A brittle froth can be easily broken, as the gas bubble-ore particle agglomerates are less stable and have a reduced tenacity. Such froth or forth layer cannot easily sustain the transportation of ore particles, and especially coarser particles, towards the froth overflow lip for collection into the launder, therefore resulting in particle drop-back to the pulp or slurry within the flotation cell or tank, and reduced recovery of the desired material. Brittle froth is typically associated with low mineralization, i.e. gas bubble-ore particle agglomerates with limited amount of ore particles comprising a desired mineral that have been able to attach onto the gas bubbles during the flotation process within a flotation cell or tank. The problem is especially pronounced in large-sized flotation cells or tanks with large volume and/or large diameter. With the invention at hand, it may be possible to crowd and direct the froth towards the froth overflow lip, to reduce the froth transportation distance (thereby reducing the risk of drop-back), and, at the same time, maintain or even reducing the overflow lip length. In other words, the handling and directing of the froth layer in a froth flotation cell or tank may become more efficient and straightforward.

It may also be possible to improve froth recovery and thereby valuable mineral particle recovery in large flotation cells or tanks from brittle froth specifically in the later stages of a flotation line, for example in the rougher and/or scavenger stages of a flotation process.

Further, with the invention described herein, the area of froth on the surface of the slurry inside a flotation tank may be decreased in a robust and simple mechanical manner. At the same time, the overall overflow lip length in a forth flotation unit may be decreased. Robust in this instance is to be taken to mean both structural simplicity and durability. By decreasing the froth surface area of a flotation unit by a froth blocker instead of adding extra froth collection launders, the froth flotation unit as a whole may be a simpler construction, for example because there is no need to lead the collected froth and/or overflow out of the added blocker. In contrast, from an extra launder, the collected overflow would have to be led out, which would increase the constructional parts of the flotation unit.

Especially in the downstream end of a flotation line, the amount of desired material that can be trapped into the froth within the slurry may be very low. In order to collect this material from the froth layer to the froth collection launders, the froth surface area should be decreased. By arranging a froth blocker between a first froth overflow lip and a second froth overflow lip in an moveable manner, the open froth surface between the forth overflow lips may be controlled. The blocker may be utilised to direct or guide the upwards-flowing slurry within the flotation tank closer to a froth overflow lip of a froth collection launder, thereby enabling or easing froth formation very close to the froth overflow lip, which may increase the collection of valuable ore particles. The froth blocker may also influence the overall convergence of flotation gas bubbles and/or gas bubble-ore particle agglomerates into the froth layer. For example, if the gas bubbles and/or gas bubble-ore particle agglomerate flow becomes directed towards the centre of a flotation tank, a froth blocker may be utilised to increase the froth area at the perimeter of the tank, and/or closer to any desired froth overflow lip.

With the invention described herein, the recovery desired ore particles in flotation may be increased. In other words, ore particles comprising very small or even minimal amounts of the desired material may be recovered for further processing/treatment. This may be especially beneficial for ores of poor quality, i.e. ores with very little valuable material initially, for example from poor mineral deposits which may have previously been considered economically too insignificant to justify utilization. It may be possible to achieve a high recovery for the entire slurry stream passing through flotation. Especially in a downstream end of a flotation line, it may possible to increase the recovery of ore particles comprising the desired mineral.

In addition, it may be possible to improve the recovery of coarser ore particles, and recovery of valuable mineral material in situations where the mineralization of flotation gas bubbles may, for a reason, be less than ideal within the flotation process.

In this disclosure, the following definitions are used regarding the invention.

By a froth blocker herein is meant a froth crowder, a froth baffle, or a crowding board, or a crowding board device.

Flotation involves phenomena related to the relative buoyancy of objects. Flotation is a process for separating hydrophobic materials from hydrophilic materials by adding flotation gas, for example air, to the process. Flotation could be made based on natural hydrophobic/hydrophilic difference or based on hydrophobic/hydrophilic differences made by addition of a surfactant or collector chemical. Gas can be added to the feedstock subject of flotation (slurry or pulp) by a number of different ways.

Basically, flotation aims at recovering a concentrate of ore particles comprising a desired mineral. Typically, the desired mineral is a valuable mineral. By concentrate herein is meant the part of slurry recovered in an overflow or underflow led out of a flotation cell. By valuable mineral is meant any mineral, metal or other material of commercial value.

Flotation involves phenomena related to the relative buoyancy of objects. The term flotation includes all flotation techniques. Flotation can be for example froth flotation, dissolved air flotation (DAF), or induced gas flotation.

By a flotation line herein is meant an assembly comprising a number, at least two, flotation units or flotation cells that are arranged in fluid connection with each other for allowing either gravity-driven or pumped slurry flow between flotation cells, to form a flotation line. The arrangement is meant for treating mineral ore particles suspended in slurry by flotation. Thus, ore particles comprising valuable metal or mineral, or any desired mineral, are recovered from ore particles suspended in slurry. For example, the desired mineral may be a valuable metal contained by the ore particles. In other instances, the desired mineral may also be the non-valuable part of the slurry, such as silicate in reverse flotation of iron.

Slurry is fed through a feed inlet to the first flotation cell of the flotation line for initiating the flotation process. Flotation arrangement may be a part of a larger flotation plant containing one or more flotation lines. Therefore, a number of different pre-treatment and post-treatment devices may be in operational connection with the components of the flotation arrangement, as is known to the person skilled in the art.

By flotation unit herein is meant a part of the flotation line comprising one or more flotation tanks. A flotation tank is typically cylindrical in shape, the shape defined by an outer wall or outer walls. The flotation cells regularly have a circular cross-section. The flotation tanks may have a polygonal, such as rectangular, square, triangular, hexagonal or pentagonal, or otherwise radially symmetrical cross-section, as well. The number of flotation units may vary according to a specific flotation line and/or operation for treating a specific type and/or grade of ore, as is known to a person skilled in the art.

The froth flotation unit may comprise a froth flotation tank, such as a mechanically agitated tank or a tank cell, a column flotation cell, a Jameson cell, a self-aspirating tank, or a dual flotation unit. In a dual flotation unit, the unit comprises at least two separate tank, a first mechanically agitated pressure vessel with a mixer and flotation gas input, and a second tank with a tailings output and an overflow froth discharge, arranged to receive the agitated slurry from the first vessel.

Depending on its type, the flotation unit may comprise a mixer for agitating the slurry to keep it in suspension. By a mixer is herein meant any suitable means for agitating slurry within the flotation cell. The mixer may be a mechanical agitator. The mechanical agitator may comprise a rotor-stator with a motor and a drive shaft, the rotor-stator construction arranged at the bottom part of the flotation cell. The cell may have auxiliary agitators arranged higher up in the vertical direction of the cell, to ensure a sufficiently strong and continuous upwards flow of the slurry. The mixer may comprise for example a “Wemco” pump type agitator which at the same time acts as a gas supply into the tank by drawing air from the surface of the slurry in the tank by rotational force of the pump and feeding this air into the slurry within the tank, or any similar device in a self-aspirating or self-aerated flotation unit or flotation tank.

By overflow herein is meant the part of the slurry collected into the launder of the flotation unit and thus leaving the flotation cell. The overflow may comprise froth, froth and slurry, or in certain cases, only or for the largest part slurry. In some embodiments, the overflow may be an accept flow containing the valuable material particles collected from the slurry. In other embodiments, the overflow may be a reject flow. This is the case in when the flotation process is utilized in reverse flotation.

By underflow herein is meant the fraction or part of the slurry which is not floated into the surface of the slurry in the flotation process. In some embodiments the underflow may be a reject flow leaving a flotation unit via an outlet which typically is arranged in the lower part of the flotation tank. Eventually the underflow from the final flotation unit of a flotation line or a flotation plant may leave the entire arrangement as a tailings flow or final residue.

In some embodiments, the underflow may be an accept flow containing the valuable mineral particles. This is the case in when the flotation arrangement, plant and/or method is utilized in reverse flotation. For example, in reverse flotation of iron (Fe), silicates are floated and collected from the froth layer, while the desired concentrate (Fe) is collected from the underflow or tailings flow. In order to reach a silicate content of less than 1.5% by weight in the Fe concentrate the last flotation cells or flotation stages of such a reverse flotation process may be difficult to operate in an optimal manner due to the low amount of froth, brittle froth, and/or low mineralization of the froth. With the invention described herein, this problem may be alleviated.

By downstream herein is meant the direction concurrent with the flow of slurry (forward current, denoted in the figures with arrows), and by upstream herein is meant the direction counter-current with or against the flow of slurry.

By pulp area herein is meant the effective open area of the flotation tank available for froth formation, as measured in the flotation tank at the height of a mixing area, i.e. the part or zone of the flotation tank in vertical direction where the slurry is agitated or otherwise induced to mix the ore particles suspended in the slurry with the flotation gas bubbles. Depending on the type of the flotation unit and/or the flotation tank, this mixing area is variable.

For example, in a flotation unit or flotation tank comprising a rotor, the mixing area is defined as the mean cross-sectional area of the tank at the rotor height. For example, in a flotation unit where the gas supply into the slurry is arranged into a pre-treatment tank prior to leading the slurry into the flotation tank, i.e. in a dual flotation tank, the mixing area is the cross-sectional area at the slurry inlet height. For example, in a flotation tank where gas is supplied via spargers (i.e. a column flotation cell), the mixing area is defined as the cross-sectional area of the tank at the sparger height.

In an embodiment of the froth flotation unit, the second froth flotation launder comprises a second overflow lip facing the centre of the tank.

By arranging a froth collection launder on the other side of the froth blocker as well, that one launder may be utilised to collect overflow from two sides, i.e. the launder has two overflow lips, one facing the froth blocker and the other the centre of the flotation tank. This kind of robust design is beneficial, as only one collecting piping for two overflow lips has to be arranged. Further, brittle froth may be more efficiently directed and crowded towards the froth collection launder on both sides of the froth blocker.

In an embodiment of the froth flotation unit, a second froth blocker is arranged inside the second lip.

In an embodiment of the froth flotation unit the first froth collection launder comprises a second overflow lip facing the perimeter of the tank.

In a further embodiment of the froth flotation unit, the tank further comprises a third froth collection launder comprising a first froth overflow lip facing the centre of the tank, the launder arranged on the perimeter of the tank, and that the first froth collection launder comprises a second overflow lip facing the perimeter of the tank, and that a third froth blocker is arranged between first froth overflow lip of the third launder and the second froth overflow lip of the first froth collection launder.

In an embodiment of the froth flotation unit, the first froth collection launder is arranged on a perimeter of the tank.

In an embodiment of the froth flotation unit, the pulp area comprises the combined area of open froth surfaces formed between any two froth overflow lips, and/or inside a froth overflow lip.

In an embodiment of the froth flotation unit, an open froth surface is dividable into two open froth subsurfaces by a froth blocker, one open froth subsurface on the side of the first froth overflow lip and one open froth subsurface on the side of the second froth overflow lip, so that the two open froth subsurfaces are completely separated by the blocker; or so that the two open froth subsurfaces are partially separated and have a fluid connection.

In an embodiment of the froth flotation unit, the cross-section of the froth blocker in the radial direction of the tank is a functional triangle. The functional triangle comprises a first vertex pointing towards a bottom of the tank, a second vertex, and a third vertex so that a top side, drawn from the second vertex to the third vertex and radially in plane with a horizontal drawn through the centre of the tank; a first side, drawn from the first vertex to the second vertex and facing a froth overflow lip adjacent to the second vertex; and a second side, drawn from the first vertex to the third vertex and facing the froth overflow lip adjacent to the third vertex, are formed.

By forming the froth blocker in the above-mentioned manner, the froth load on each side of the froth blocker may be easily and simply balanced and controlled, and the directing and/or crowding of froth, especially brittle froth, may be efficiently affected on both sides of the blocker.

By functional triangle herein is meant that the froth blocker may have a cross-section that is essentially triangular in shape. However, the outer edges of the froth blocker may not be completely even or straight. Due to, for example, manufacturing factors, the shape may be more organic, the edges may be wavy, lumpy or in other ways uneven. This, however, does not affect the functionality of the froth blocker, as its basic form is, as described herein, a triangle with three distinct sides and three vertexes at the points where any two sides are connected. The functional triangle and its parts as described below, is utilised herein to describe the basic shape of the froth blocker.

By froth load herein is meant the amount of froth in an open surface area over any given time period.

This kind of shape or construction allows for a robust way of utilising the froth blocker for dividing, directing and balancing froth and slurry into the two open froth areas or froth surfaces on either side of the froth blocker.

In a further embodiment of the froth flotation unit, the froth blocker is arranged to have a form which allows a froth load to be balanced between an open froth subsurface on the first side of the functional triangle and an open froth subsurface on the second side of the functional triangle.

In a further embodiment of the froth flotation unit, a first angle formed between a vertical line drawn from the first vertex to the top side of the functional triangle and the first side is 0-30°.

In yet another embodiment of the froth flotation unit, a second angle between the vertical line of the functional triangle and the second side is 20-45°.

In a further embodiment of the froth flotation unit, the functional triangle is a scalene triangle wherein the second angle is at least 5°, preferably at least 10°, larger than the first angle.

By scalene herein is meant that the two sides of the triangle may be unequal in length, i.e. the functional triangle may have unequal sides.

In an embodiment of the froth flotation unit, the area of an open froth surface is arranged to be varied so that the relationship between the two open froth subsurfaces separated by a froth blocker is changed.

In an embodiment of the froth flotation unit, the relationship between the two open froth subsurfaces separated by a froth blocker is arranged to be varied by changing the vertical position of the froth blocker in relation to the height of a froth overflow lip next to the froth blocker, and/or by moving the position of the first vertex of the functional triangle in relation to the froth overflow lip next to the froth blocker.

In an embodiment of the froth flotation unit, the relationship between the two open froth subsurfaces separated by a froth blocker is arranged to be varied by moving the froth blocker vertically in relation to the height of the first froth overflow lip next to the froth blocker, and/or by moving the position of the first vertex of the functional triangle in relation to the centre of the tank.

By moving only the froth blocker, the construction may be kept simple. If the froth collecting launder was to be moved, the controlling of that movement would be extremely precise and accurate, as it would affect the height of the froth layer. If a lip would end up slanted or deviate from the horizontal, problems in collecting the froth into the launders would arise. Obviously the froth blocker needs to be positioned carefully, as well, but even if the froth blocker would deviate somewhat from the horizontal, the froth layer height would not be as adversely affected.

In an embodiment of the froth flotation unit, the relationship between the two open froth subsurfaces separated by a froth blocker is arranged to be varied by moving the froth blocker vertically in relation to the height of the first froth overflow lip next to the froth blocker.

The relative position of the lower part of the froth blocker, i.e. the first vertex of the functional triangle, may have an effect on the froth formation, especially on the amount of air or other flotation gas directed into the froth layer, and thereby on the volume of froth. In this way, the various open froth surfaces and subsurfaces may be balanced and an overflow of valuable material containing particles increased. Further, the crowding and/or directing of the froth, especially brittle froth, may be more efficient and simple. Furthermore, by arranging the froth blocker to be moveable, instead of moving the froth overflow lip or lips, the overall construction may become more robust and easier to control. Moving the froth blocker is not as critical to the controlling of the flotation process as moving the froth overflow lip would be.

In an embodiment of the froth flotation unit, an open froth surface is dividable into two open froth subsurfaces by a froth blocker, one open froth subsurface on the side of the first froth overflow lip and one open froth subsurface on the side of the second froth overflow lip, so that the two open froth subsurfaces are partially separated and have a fluid connection.

By arranging the open froth subsurfaces to have a fluid connection, the construction and utilisation of the froth flotation unit may further be simplified, leading to even more robust construction. In the case the froth blocker is not able to perfectly balance the froth layers on both sides of the froth blocker, the fluid connection enable the balancing.

In particular, by arranging the froth blocker to be movable in the vertical direction it may be ensured that the movements of the froth are equal throughout the open froth area. This kind of construction is even more robust, and may further improve the balancing of froth within and into the separate froth surfaces and/or subsurfaces.

In an embodiment of the froth flotation unit, the froth blocker is a continuous circle.

In an embodiment of the froth flotation unit, the froth blocker comprises individual circle arcs and discontinuation points between the arcs so that a fluid connection between the open froth subsurfaces is formed.

In an embodiment of the froth flotation unit, the froth blocker is a segment of the tank.

In an embodiment of the froth flotation unit, the froth blocker is a circle segment of the tank.

In an embodiment of the froth flotation unit, the froth blocker is arranged to be movable along a rotational axis so that the position of the first vertex may be changed in relation to centre of the tank.

In a further embodiment of the froth flotation unit, the rotational axis is parallel to a chord of the tank.

In an embodiment of the froth flotation unit, the gas supply is arranged into the tank.

By arranging a gas supply directly into the flotation tank, no additional gasification tanks or systems are needed within the flotation system, therefore making the overall construction simpler and easier to operate and maintain.

In an embodiment of the froth flotation unit, the tank comprises a mixing device.

In an embodiment of the froth flotation unit, the mixing device comprises a gas supply.

In an embodiment of the froth flotation unit, the pulp area is at least 40 $m^2$, measured at mixing area.

In an embodiment of the froth flotation unit, a distance between a froth overflow lip and the first side of a froth blocker or the second side of a froth blocker is at most 500 mm, preferably from 100 to 500 mm.

In an embodiment of the froth flotation line, a froth flotation unit is arranged into a downstream end of the flotation line.

In an embodiment of the froth flotation line, the line comprises at least two conventional flotation units and/or at least two additional froth flotation units according to the invention, arranged to treat the slurry before it is arranged to be treated in the froth flotation unit according to the invention.

Any type of flotation unit or flotation tank may be utilised as a conventional flotation unit, and the type may be chosen according to the specific needs set by the type of material to be treated in the flotation line. It is conceivable, that the froth flotation unit or units according to the invention may be incorporated into existing flotation lines as rebuilds, to increase the variability in use, as well as the efficiency in collecting the desired valuable material, of the flotation line. Typically, in the downstream end of a flotation line, the amount of ore particles containing the valuable material is low, as most part of the floatable material has been trapped and collected already in the upstream part of the flotation line. By introducing one or more froth flotation units according to the invention into the downstream end of such a flotation line, even the low amount may be efficiently collected with the help of the froth blocker arrangement described herein, and thus the overall efficiency of the flotation line improved. This may be especially beneficial in operations where the froth or froth layer is brittle and/or mineralization is low.

In an embodiment of the use of the froth flotation line according to the invention, the flotation line is arranged to recover mineral ore particles comprising a desired mineral from low grade ore.

In a yet another embodiment of the use of the froth flotation line according to the invention, the flotation line is arranged to recover mineral ore particles comprising Cu from low grade ore.

For example, in recovering copper from low grade ores obtained from poor deposits of mineral ore, the copper amounts may be as low as 0.1% by weight of the feed, i.e. infeed of slurry into the flotation arrangement. The flotation arrangement according to the invention may be very practical for recovering copper, as copper is a so-called easily floatable mineral. By using the flotation line according to the present invention, the recovery of such low amounts of valuable mineral, for example copper, may be efficiently increased, and even poor deposits cost-effectively utilized. As the known rich deposits have increasingly already been used, there is a need for processing the less favourable deposits as well, which previously may have been left unmined due to lack of suitable technology and processes for recovery of the valuable material in very low amounts in the ore.

In an embodiment of the froth flotation method, the two open froth subsurfaces are completely separated by the froth blocker.

In a further embodiment of the froth flotation method, the two open froth subsurfaces are partially separated by the froth blocker and have a fluid connection.

In an embodiment of the froth flotation method, the area of an open froth surface is varied so that the relationship between the two open froth subsurfaces separated by a froth blocker is changed.

In an embodiment of the froth flotation method, the relationship between the two open froth subsurfaces separated by a froth blocker is varied by changing the vertical position of the froth blocker in relation to the height of a froth overflow lip next to the froth blocker.

In an embodiment of the froth flotation method, the relationship between the two open froth subsurfaces separated by a froth blocker is varied by moving the position of the first vertex of the functional triangle in relation to the froth overflow lip next to the froth blocker.

In an embodiment of the froth flotation method, the relationship between the two open froth subsurfaces separated by a froth blocker is varied by moving the froth blocker vertically in relation to the height of the first froth overflow lip next to the froth blocker.

In an embodiment of the froth flotation method, the relationship between the two open froth subsurfaces separated by a froth blocker is varied by moving the position of the first vertex of the functional triangle in relation to the centre of the tank.

In an embodiment of the froth flotation method, the froth blocker is arranged to be movable along a rotational axis so that the position of the first vertex may be changed in relation to centre of the tank.

BRIEF DESCRIPTION OF THE DRAWINGS

The accompanying drawings, which are included to provide a further understanding of the current disclosure and which constitute a part of this specification, illustrate embodiments of the invention and together with the description help to explain the principles of the invention. In the drawings:

FIGS. 2*a-c* are a schematic illustration of another exemplary embodiment of the unit according to the invention.

FIGS. 4*a-c* are a schematic illustration of yet another exemplary embodiment of the unit according to the invention.

DETAILED DESCRIPTION OF THE INVENTION

Figure 1A:
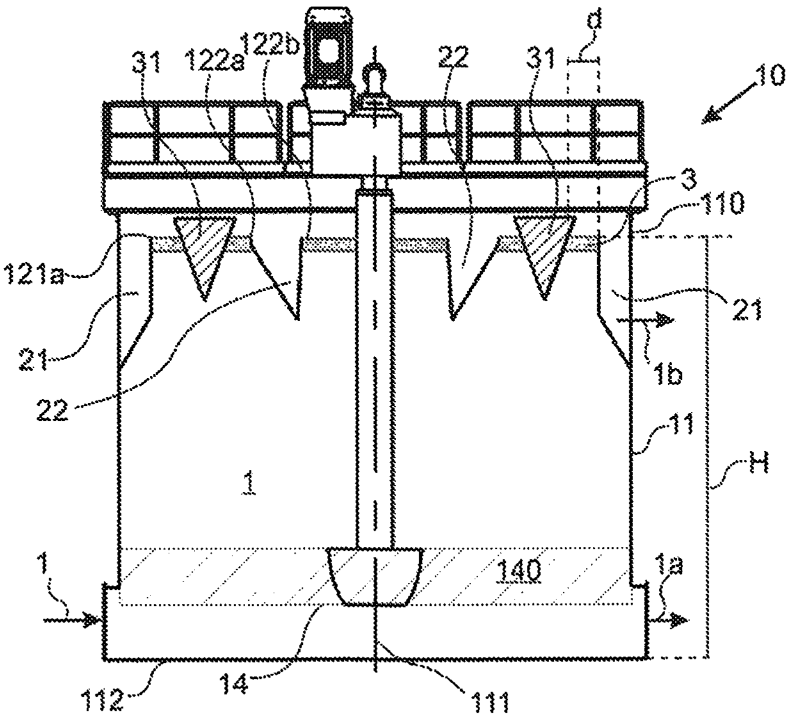
FIGS. 1*a-c* are a schematic illustration of an exemplary embodiment of the unit according to the invention.
Figure 1B:
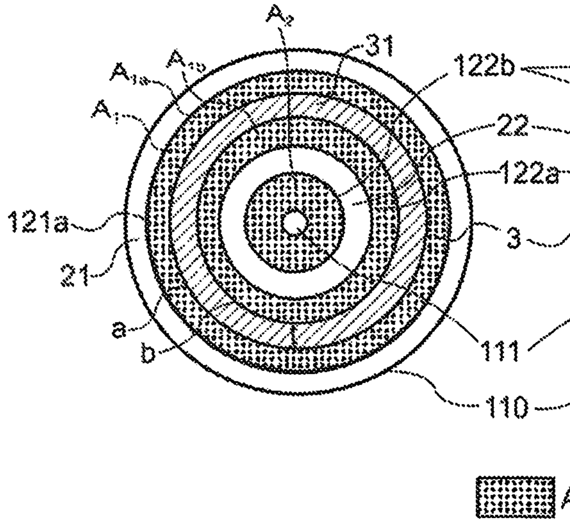

Reference will now be made in detail to the embodiments of the present invention, examples of which are illustrated in the accompanying drawings.

The description below discloses some embodiments in such a detail that a person skilled in the art is able to utilize the unit, use, line and method based on the disclosure. Not all steps of the embodiments are discussed in detail, as many of the steps will be obvious for the person skilled in the art based on this disclosure. The figures are not drawn to proportion, and many of the components of the flotation unit 10 and the flotation line 50 are omitted for clarity. The forward direction of flow of slurry 1 is shown in the figures by arrows.

For reasons of simplicity, item numbers will be maintained in the following exemplary embodiments in the case of repeating components.

In FIGS. 1 to 6, a tank 11 of a flotation unit 10 receives a flow of suspension, that is, a flow of slurry 1 comprising ore particles, water and flotation chemicals such as collector chemicals and non-collector flotation reagents. The collector chemical molecules adhere to surface areas on ore particles having a desired mineral to be floated, through an adsorption process. The desired mineral acts as the adsorbent while the collector chemical acts as the adsorbate. The collector chemical molecules form a film on the areas of the desired mineral on the surface of the ore particle to be floated. Typically, the desired mineral is a valuable mineral contained in the ore particle. In reverse flotation, the mineral may be the invaluable part of the slurry suspension thus collected away from the concentrate of the valuable material. For example in reverse flotation of Fe, silicate-containing ore particles are floated while the valuable Fe-containing ore particles are collected from the underflow or tailings.

The collector chemical molecules have a non-polar part and a polar part. The polar parts of the collector molecules adsorb to the surface areas of ore particles having the valuable minerals. The non-polar parts are hydrophobic and are thus repelled from water. The repelling causes the hydrophobic tails of the collector molecules to adhere to flotation gas bubbles. An example of a flotation gas is atmosphere air introduced, for example by blowing, compressing or pumping, into flotation unit 10 or a tank 11 of the flotation unit 10. A sufficient amount of adsorbed collector molecules on sufficiently large valuable mineral surface areas on an ore particle may cause the ore particle to become attached to a flotation gas bubble. This phenomenon may be called mineralization. In low mineralization, less than optimal amount of ore particles are attached to flotation gas bubbles, leading to brittle froth and problems in recovering the desired ore particles from the froth layer to a froth overflow lip and froth collection launder.

Ore particles become attached or adhered to gas bubbles to form gas bubble-ore particle agglomerates. These agglomerates rise to the surface of the flotation tank 11 at the uppermost part of the tank 11 by buoyancy of the gas bubbles, as well as with the continuous upwards flow of slurry induced by mechanical agitation and/or the infeed of slurry 1 into the tank 11. The gas bubbles form a layer of froth 3, and the froth 3 gathered to a surface of slurry in froth flotation unit 10, comprising the gas bubble-ore particle agglomerates is let to flow out of flotation unit 10 as an overflow 1*b* via a froth overflow lip 121*a* into a froth collection launder 21.

The collected slurry overflow 1*b* may be led to further processing or collected as a final product, depending on the point of a flotation line, at which the overflow 1*b* is collected. Further processing may comprise any necessary process steps to increase the product grade, for example regrinding and/or cleaning. Tailings may be arranged to flow as an underflow 1*a* via an outlet to a subsequent flotation cell and finally out of the process as gangue or final residue.

Figure 5A:
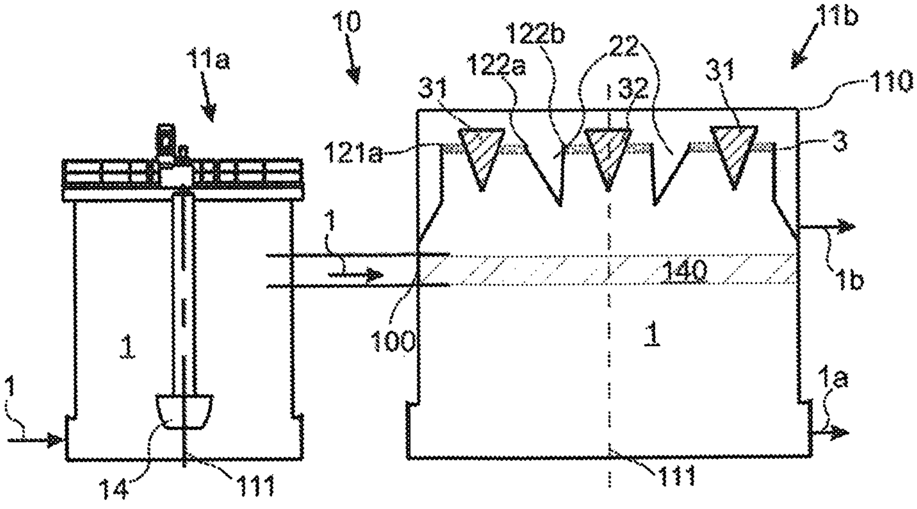
FIGS. 5*a-b* are a schematic illustration of yet another exemplary embodiment of the unit according to the invention.
Figure 5B:
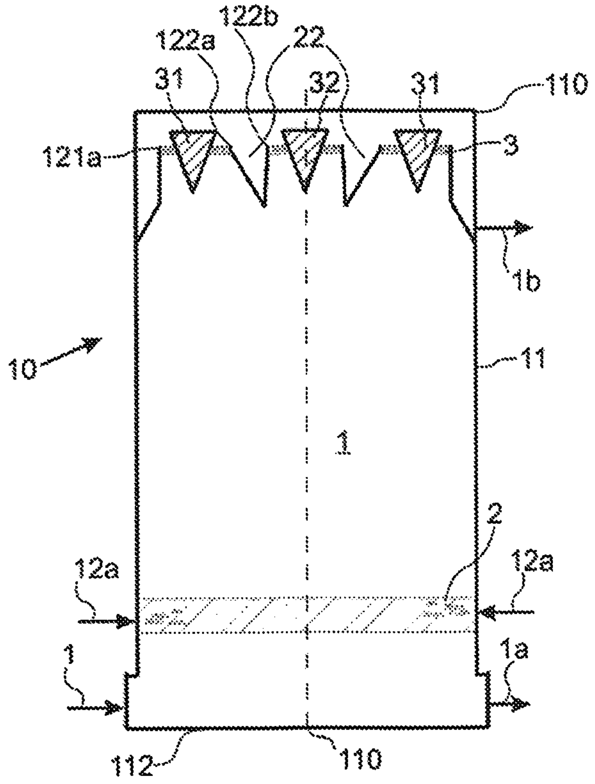

The slurry 1 is first introduced into an overflow flotation unit 10, in which the slurry 1 is treated by introducing flotation gas into the slurry by a gas supply 12 (see FIG. 4*a*, 5*b*) which may be any conventional means of gas supply. For example, the gas may be led into the tank via a mixing device 14 (FIG. 1*a*-4*a*), or into a tank without a mixing device via gas inlets (FIG. 5*b*), as is the case in a column flotation cell. The flotation gas may be introduced into the tank 11. The flotation gas may be incorporated into to slurry prior to leading the slurry 1 into the flotation tank 11*b* in a separate pre-treatment tank 11*a*, as is the case in a dual flotation cell (FIG. 5*a*).

The slurry may be agitated mechanically by a mixing device 14, i.e. the tank 11 comprises a mixing device 14, which may be, for example, a rotor-stator type agitator disposed in the flotation tank 11 (FIG. 1*a*, 2*a*, 3*a*), or by a pump 14, 12 in a so-called self-aspirating tank, as shown in FIG. 4*a* (the pump acts as both a mixing device 14 and a gas supply 12), or by utilising any other type of mechanical agitation known in the art. There may be one or more auxiliary agitators disposed in the flotation tank 11 in the vertical direction of the flotation tank 11, as well.

In an embodiment of the froth flotation unit 10, as seen in FIG. 1*a*, the tank 11 comprises a centre 111 and a perimeter 110, and a first froth collection launder 21 comprising a first froth overflow lip 121*a* facing towards the centre 111 of the tank 11. The first froth collection launder 21 may be arranged at the perimeter 110 of the tank 11.

A second froth collection launder 22 comprising a first froth overflow lip 122*a*, also facing the perimeter 110 of the tank, is arranged inside the first froth collection launder 21. Between the first froth collection launder 21 and the second froth collection launder 22, a froth blocker 31 is arranged. More specifically, the froth blocker 31 is arranged between the first froth overflow lip 121*a* of the first froth collection launder 21 and the first froth overflow lip 122*a* of the second froth collection launder 22.

Figure 1C:
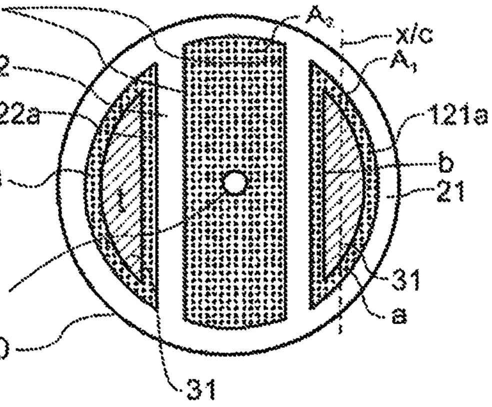

The froth blocker 31 may be positioned and moved so that it is capable of dividing an open froth surface $A_1$ into two subsurfaces $A_{1a}$, $A_{1b}$, one open froth subsurface $A_{1a}$ on the side of the first froth overflow lip 121*a* and one open froth subsurface $A_{1b}$ on the side of the second froth overflow lip 122*a*, so that the two open froth subsurfaces are completely separated by the blocker (FIG. 1*b*); or so that the two open froth subsurfaces $A_{1a}$, $A_{1b}$ are partially separated and have a fluid connection (FIG. 1*c*).

The froth flotation unit 10 comprises a pulp area A, which is the effective froth surface area, i.e. the largest possible area on which froth may be formed, of the tank 11, measured as an area of pulp at the height of a mixing area 140, and which is in principle available for the formation of a froth layer 3.

Figure 3A:
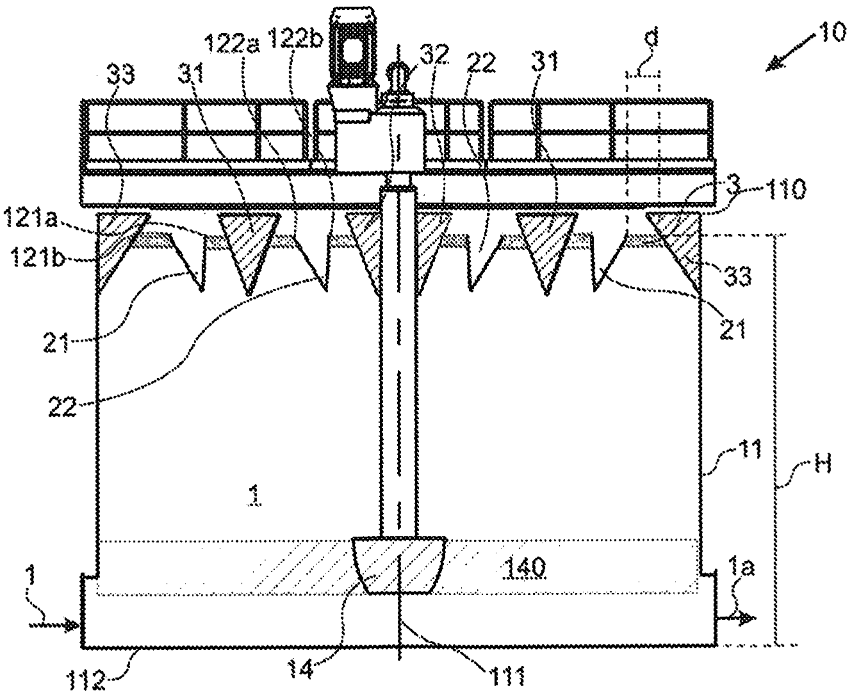
FIGS. 3*a-c* are a schematic illustration of another exemplary embodiment of the unit according to the invention.

The mixing area 140 depends on the type of flotation tank, and can be for example flotation tank 10 comprising a rotor 14, the mixing area 140 is defined as the mean cross-sectional area of the tank at the rotor height (FIG. 1*a*, 2*a*, 3*a*). In a self-aspirating tank 10 (FIG. 4*a*), the mixing area 140 is defined as the mean cross-sectional area of the tank 10 at the pump 14, 12 height. In a flotation unit 10 where the gas supply 12 into the slurry is arranged into a pre-treatment tank 11*a* prior to leading the slurry into the flotation tank 11*b*, i.e. in a dual flotation tank (FIG. 5*a*), the mixing area 140 is the cross-sectional area at the height of a slurry inlet 100. In a flotation tank 10 where gas 2 is supplied via gas supply spargers 12*a* (not shown in detail), i.e. a column flotation cell (FIG. 5*b*), the mixing area 140 is defined as the cross-sectional area of the tank 10 at the gas supply sparger 12*a* height.

The pulp area A is the combined area of open froth surfaces $A_1$, $A_2$, $A_3$ formed between any two forth overflow lips 121*a*, 122*a* and/or inside a froth overflow lip 122*b*. The pulp area A may be at least 15 $m^2$. In an embodiment, the pulp area A may be at least 40 $m^2$. For example the pulp area A may be 40-400 $m^2$. For example, the pulp are A may be 75 $m^2$, 100 $m^2$, 150 $m^2$, 360 $m^2$.

The second froth flotation launder 22 may comprise also a second overflow lip 122*b* facing the centre 111 of the tank 11. There may be a second froth blocker 32 arranged inside the second overflow lip 122*b*, as shown in FIG. 2*a-c*.

Figure 3B:
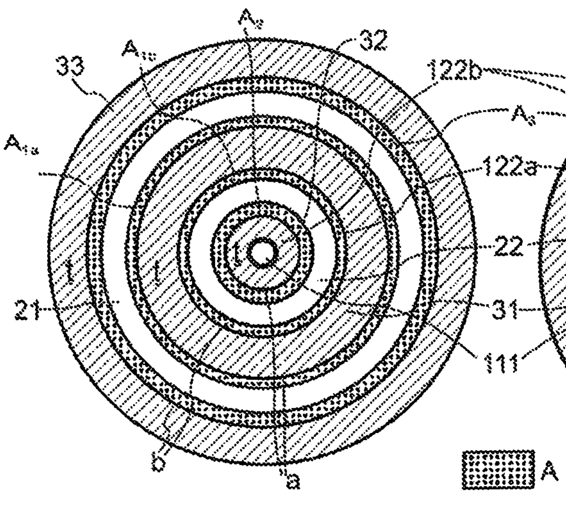
Figure 3C:
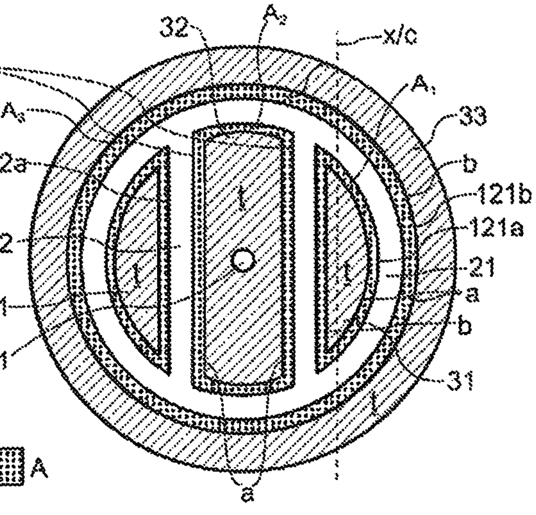

The first froth collection launder 21 may also comprise a second overflow lip 121*b* facing the perimeter 110 of the tank 11. In other words, the first froth collection launder 21 may be arranged at a distance from the perimeter 110 of the tank 11, as can be seen in FIG. 3*a-c*. A third froth blocker 33 may be arranged on the perimeter 110 of the tank 11, between the perimeter 110 and the second overflow lip 121 *b*.

A third froth collection launder 23 may be arranged on the perimeter 110 of the tank 11. The third froth collection launder 23 comprises a first froth overflow lip 123*a* facing the centre 111 of the tank 11. The third froth blocker 33 may be arranged may be arranged between the first overflow lip 123*a* of the third froth collection launder 23 and the second froth overflow lip 121*b* of the first froth collection launder 21 (not shown in the figures).

A distance d between a froth overflow lip 121*a*, 121*b*, 122*a*, 122*b*, 123*a* and the first side a or the second side b of the froth blocker 31, 32, 33 is at most 500 mm. Preferably, the distance d is 100-500 mm, for example 110 mm, 175 mm, 230 mm, 295 mm, 340 mm, 400 mm.

Therefore the pulp area A may be comprised of for example two open froth surfaces $A_1$, $A_2$ (FIGS. 1*b-c* and 2*b*, 4*c*), three open froth surfaces $A_1$, $A_2$, $A_3$ (3*b-c*, 4*b*), four open froth surfaces (not shown in the figures), depending on the number of froth collection launders 21, 22, 23 and their positions, and the number of overflow lips 121*a*, 121*b*, 122*a*, 122*b*, 123*a*, as well as the number of froth blockers 31, 32, 33 arranged between the overflow lips 121*a*, 121*b*, 122*a*, 122*b*, 123*a* or inside the overflow lip 121*b*, 122*b*.

An open froth surface $A_1$ may be divided into two open froth subsurfaces ($A_{1a}$, $A_{1b}$) by the froth blocker 31 so that a first open froth subsurface $A_{1a}$ is formed on the side of the first froth overflow lip (121*a*) and a second open froth subsurface $A_{1b}$ is formed on the side of the second froth overflow lip 122*a* so that the two open froth subsurfaces are completely separated from each other.

In that case, the froth blocker 31, 32, 33 may have a form of a continuous circle (FIG. 1*b*, 2*b*, 3*b*, 4*b*).

Figure 6:
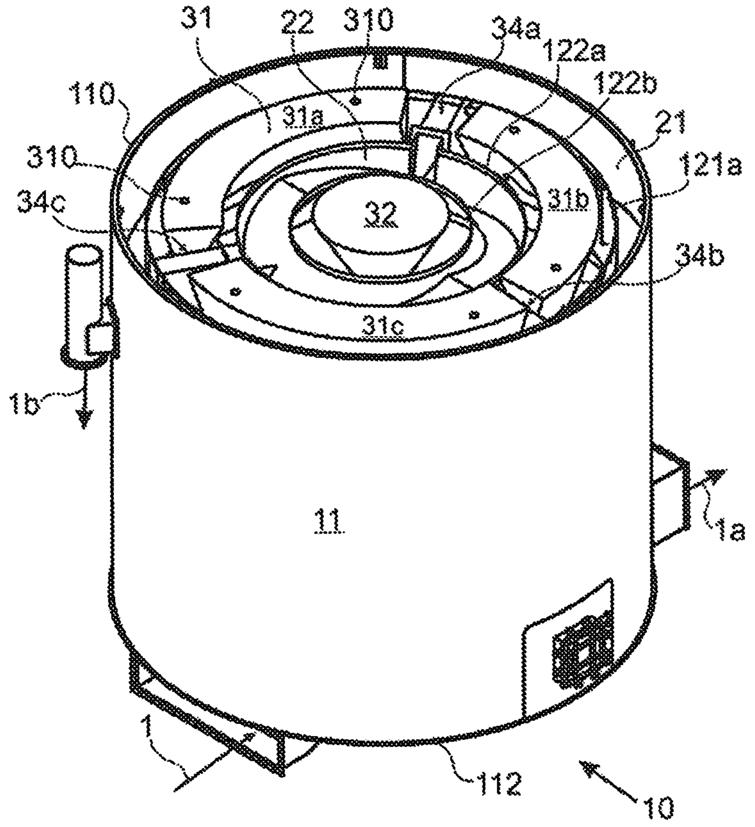
FIG. 6 is a schematic three-dimensional projection of an exemplary embodiment of the unit according to the invention.

An open froth surface $A_1$ may be divided into two open froth subsurfaces ($A_{1a}$, $A_{1b}$) by the froth blocker 31 so that a first open froth subsurface $A_{1a}$ is formed on the side of the first froth overflow lip (121*a*) and a second open froth subsurface $A_{1b}$ is formed on the side of the second froth overflow lip 122*a* so that the two open froth subsurfaces are partially separated and have a fluid connection (see for example FIG. 1*c*, 2*c*, 6).

In that case, the froth blocker 31, 32, 33 may comprise individual circle arcs 31*a*, 31*b*, 31*c* and discontinuation points 34*a*, 34*b*, 34*c* (see FIG. 6) between the arcs 31*a*, 31*b*, 31*c* so that a fluid connection between the open froth subsurfaces $A_{1a}$, $A_{1b}$. Circular froth blockers 31, 32, 33 or froth blockers comprising individual circle arcs 31*a*, 31*b*, 31*c* may be moved as described above.

Alternatively, the froth blocker 31, 32, 33 may be a segment of the tank 11, as can be seen in FIG. 1*c*, 2*c*, 3*c*, 4*c*. This kind of arrangement may be preferable in a froth flotation unit 10 in which the tank 11 has a cross-section deviant from a circle, for example, if the cross-section is rectangular or partially rectangular. In a cylindrical tank 11, more specifically, the froth blocker 31, 32, 33 may be a circle segment 35*a*, 35*b*, 35*c* of the tank 11 (see FIG. 2*c*).

A froth blocker 31, 32, 33 of the aforementioned segment or circle segment 35*a*, 35*b*, 35*c* type may be moved along a rotational axis x so that the position of the first vertex 301 may be changed in relation to the centre of the tank. The rotational axis x may be parallel to a chord c of the tank 11.

Each of the open froth surfaces $A_1$, $A_2$, $A_3$ may be divided into open froth subsurfaces $A_{1a}$, $A_{1b}$, respectively, depending, again, on the number and position of froth blockers 31, 32, 33.

The area of an open froth surface $A_1$ may be varied so that the relationship between the two open froth subsurfaces $A_{1a}$, $A_{1b}$ separated by a blocker 31 is changed.

The relationship between the two open froth subsurfaces $A_{1a}$, $A_{1b}$ separated by a blocker 31 may be varied by changing the vertical position of the froth blocker 31, 32, 33 in relation to a height H of a froth overflow lip 121*a*, 122*a*, 121*b*, 122*b*, 123*a* next to the froth blocker 31, 32, 33. Alternatively or additionally, the relationship between the two open froth subsurfaces $A_{1a}$, $A_{1b}$ separated by a blocker 31 may be varied by moving the position of the first vertex 301 of the functional triangle 300 in relation to the froth overflow lip 121*a*, 122*a*, 121*b*, 122*b*, 123*a* next to the froth blocker 31, 32, 33.

In an embodiment, the relationship between the two open froth subsurfaces $A_{1a}$, $A_{1b}$ separated by a blocker 31, 32, 33 may be varied by moving the froth blocker 31, 32, 33 vertically in relation to the height H of the first froth overflow lip 121*a*, 122*a*, 123*a* next to the froth blocker 31, 32, 33. Alternatively or additionally, the relationship between the two open froth subsurfaces $A_{1a}$, $A_{1b}$ separated by a blocker 31, 32, 33 may be varied by moving the position of the first vertex 301 of the functional triangle 300 in relation to the centre 111 of the tank 11.

The froth blocker 31, 32, 33 may be arranged to be moved by any suitable actuator or regulating unit known in the art, powered for example by an electric motor, or by hydraulic or pneumatic transfer equipment.

Figure 7A:
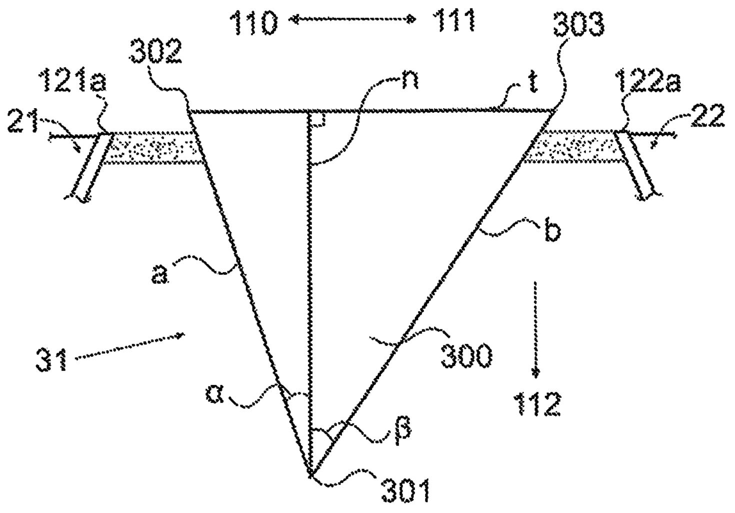
FIGS. 7*a-b* are schematic cross-sectional illustrations showing the geometry of a froth blocker according to the invention.
Figure 7B:
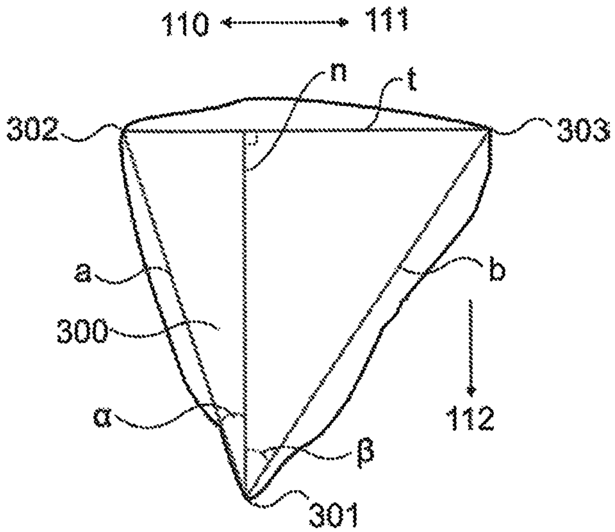

The froth blockers 31, 32, 33 may have a cross-section in the form of a functional triangle 300, in the radial direction of the tank 11, as can be seen in FIG. 7*a*-*b*. The functional triangle 300 comprises a first vertex 301 pointing towards the bottom 112 of the tank 11, a second vertex 302 and a third vertex 303. A top side t of the functional triangle 300 is formed by a line drawn from the second vertex 302 to the third vertex 303, radially in plane with a horizontal drawn through the centre 111 of the tank 11. A first side a is formed by a line drawn from the first vertex 301 and the second vertex 302. Side a faces the froth flotation lip 121*a* adjacent to the second vertex 302. A second side b is formed by a line drawn first vertex 301 to the third vertex 303. Side b faces the froth flotation lip 122*a* adjacent to the third vertex 303. In reality, the froth blocker may have uneven sides t, a, b, as can be seen in FIG. 7*b*, due to manufacturing factors such as materials or manufacturing methods, but in effect, the shape of the functional triangle 300 may always be detectable from the cross-section of the froth blocker 31, 32, 33.

The froth blocker may be manufactured from plastic, metal or a composite material by any suitable manufacturing method.

A first angle α is formed between a vertical line n drawn from the first vertex 301 to the top side t of the functional triangle 300 and the first side a. The first angle α may be 0-30°, for example 2.5°; 3.8°; 5°; 9.3°; 15.5°; 21.6°; 27.2°, A second angle β is formed between the vertical line n and the second side b. The second angle β may be 20-45°, for example 21.5°; 25°; 31.2°; 37.5°; 40.3°; 44.8°.

The functional triangle 300 may be in form a scalene triangle with unequal sides a, b. The second angle β is, in that case, at least 5°, preferably at least 10° larger than the first angle α.

Figure 8:
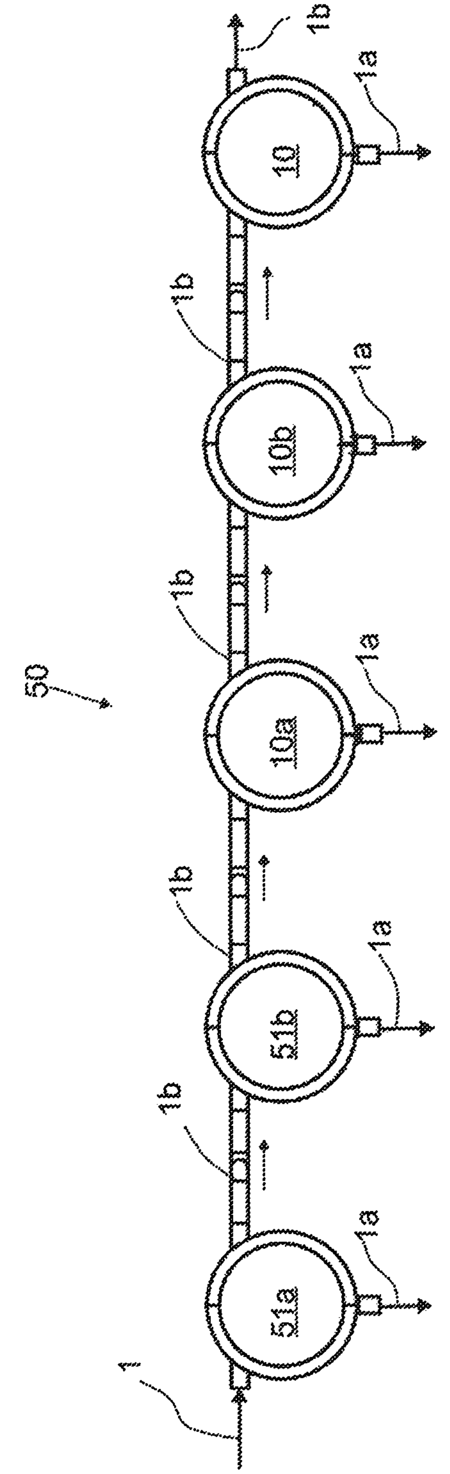
FIG. 8 is a schematic illustration of a flotation line according to the invention.

The froth flotation unit 10 described above may be a part of a froth flotation line 50 (see FIG. 8). A flotation line 50 is an arrangement for treating the slurry 1 for separating valuable metal containing ore particles from ore particles suspended in the slurry in several fluidly connected flotation units 10, 51 which may be of any conventional type known to a person skilled in the art. At least one of the flotation units may be a froth flotation unit 10 according to this disclosure. Preferably, the at least one froth flotation unit 10 is arranged into a downstream end of the flotation line 50. The flotation line 50 may comprise at least two conventional flotation units 51*a*, 51*b*, and/or at least two additional froth flotation units 10*a*, 10*b* arranged to treat the slurry 1 before it is led into the froth flotation unit 10.

A froth flotation line 50 comprising at least one froth flotation unit 10 according to the present disclosure may be used in recovering mineral ore particles comprising a valuable mineral from a low-grade ore. More specifically, the froth flotation line 50 may be used in recovering mineral ore particles comprising copper (Cu) from low grade ore. The amount of Cu may be as low as 0.1% by weight of the feed, i.e. infeed of slurry into the flotation arrangement.

In the froth flotation method for treating mineral ore particles suspended in slurry, the slurry 1 is separated into an underflow 1*a* and an overflow 1*b* in a froth flotation unit 10 according to the present disclosure. An open froth surface $A_1$ of a flotation tank 11 is divided into two open froth subsurfaces $A_{1a}$, $A_{1b}$ by a froth blocker 31 arranged between a first overflow lip 121*a* of a first froth collection launder 21 and a first overflow lip 122*a* of a second froth collection launder 22, as described above in connection with the forth flotation unit 10. The two open froth subsurfaces $A_{1a}$, $A_{1b}$ may be completely separated by the blocker 31. Alternatively, the two open froth subsurfaces $A_{1a}$, $A_{1b}$ may be partially separated and have a fluid connection.

The area of an open froth surface $A_1$ may be varied so that the relationship between the two open froth subsurfaces $A_{1a}$, $A_{1b}$ separated by a blocker 31 is changed. In more detail, the relationship between the two open froth subsurfaces $A_{1a}$, $A_{1b}$ separated by a blocker 31 may be varied by changing the vertical position of the froth blocker 31 in relation to the height H of a froth overflow lip 121*a*, 122*a* next to the froth blocker 31. Alternatively or additionally, the relationship between the two open froth subsurfaces $A_{1a}$, $A_{1b}$ separated by a blocker 31 may be varied by moving the position of the first vertex 301 of the functional triangle 300 in relation to the froth overflow lip 121*a*, 122*a* next to the froth blocker 31.

In an embodiment, the relationship between the two open froth subsurfaces $A_{1a}$, $A_{1b}$ separated by a blocker 31 may be varied by moving the froth blocker 31 vertically in relation to the height H of the first froth overflow lip 121*a* next to the froth blocker. Alternatively or additionally, the relationship between the two open froth subsurfaces $A_{1a}$, $A_{1b}$ separated by a blocker 31 may be varied by moving the position of the first vertex 301 of the functional triangle 300 in relation to the centre 111 of the tank 11.

In an embodiment, the froth blocker 31 may be arranged to be movable along a rotational axis x so that the position of the first vertex 301 may be changed in relation to centre 111 of the tank 11.

It is obvious to a person skilled in the art that with the advancement of technology, the basic idea of the invention may be implemented in various ways. The invention and its embodiments are thus not limited to the examples described above, instead they may vary within the scope of the claims.

The invention claimed is:

1. A froth flotation unit for treating mineral ore particles suspended in slurry and for separating the slurry into an underflow and an overflow, the froth flotation unit comprising:

a tank with a center and a perimeter, a gas supply for introducing flotation gas into the slurry to form froth, and a first froth collection launder comprising a first froth overflow lip of the first froth collection launder facing towards the center of the tank, wherein the froth flotation unit has a pulp area of at least 15 $m^2$, measured at a mixing area, wherein the froth flotation unit further comprises:

a second froth collection launder arranged inside the first froth collection launder, the second froth collection launder comprising a first froth overflow lip of the second froth collection launder facing the perimeter of the tank, and a froth blocker arranged between the first froth overflow lip of the first froth collection launder and the first froth overflow lip of the second froth collection launder, a cross-section of the froth blocker defining a scalene triangle, and wherein an open froth surface of the tank is divided into two open froth subsurfaces by the froth blocker, the two open froth subsurfaces being partially separated by the froth blocker and having a fluid connection, wherein the area of the open froth surface is arranged to be varied in response to vertical movement of the froth blocker so that the relationship between the two open froth subsurfaces separated by the froth blocker is changed.

2. The froth flotation unit according to claim 1, wherein the second froth collection launder comprises a second overflow lip facing the center of the tank.

3. The froth flotation unit according to claim 1, wherein a second froth blocker is arranged inside a second overflow lip of the second froth collection launder.

4. The froth flotation unit according to claim 1, wherein the first froth collection launder comprises a second overflow lip of the first froth collection launder facing the perimeter of the tank.

5. The froth flotation unit according to claim 1, wherein the tank further comprises:

a third froth collection launder comprising:

a first froth overflow lip of the third froth collection launder facing the center of the tank, the third froth collection launder arranged on the perimeter of the tank, and that the first froth collection launder comprises a second overflow lip of the first froth collection launder facing the perimeter of the tank, and that a third froth blocker is arranged between the first froth overflow lip of the third froth collection launder and the second froth overflow lip of the first froth collection launder.

6. The froth flotation unit according to claim 1, wherein the first froth collection launder is arranged on the perimeter of the tank.

7. The froth flotation unit according to claim 1, wherein the cross-section of the froth blocker in the radial direction of the tank includes a first vertex pointing towards a bottom of the tank, a second vertex, and a third vertex so that a top side, drawn from the second vertex to the third vertex and radially in plane with a horizontal drawn through the center of the tank; a first side, drawn from the first vertex to the second vertex and facing a froth overflow lip adjacent to the second vertex; and a second side, drawn from the first vertex to the third vertex and facing the froth overflow lip adjacent to the third vertex, are formed.

8. The froth flotation unit according to claim 7, wherein the area of the open froth surface is arranged to be varied so that the relationship between the two open froth subsurfaces separated by the froth blocker is changed by moving the position of the first vertex of the froth blocker in relation to the first froth overflow lip of the first froth collection launder next to the froth blocker.

9. The froth flotation unit according to claim 7, wherein froth blocker allows a froth load to be balanced between an open froth subsurface on the first side of the froth blocker and an open froth subsurface on the second side of the froth blocker.

10. The froth flotation unit according to claim 7, wherein a first angle formed between a vertical line drawn from the first vertex to the top side of the functional triangle and the first side is from 0°-30°.

11. The froth flotation unit according to claim 10, wherein a second angle between the vertical line of the functional triangle and the second side is from 20°-45°.

12. The froth flotation unit according to claim 11, wherein the second angle is at least 5° larger than the first angle.

13. The froth flotation unit according to claim 1, wherein the relationship between the two open froth subsurfaces separated by the froth blocker is arranged to be varied by changing the vertical position of the froth blocker in relation to the height of the first froth overflow lip of the first froth collection launder next to the froth blocker.

14. The froth flotation unit according to claim 1, wherein the relationship between the two open froth subsurfaces separated by the froth blocker is arranged to be varied by moving the froth blocker vertically in relation to the height of the first froth overflow lip of the first froth collection launder next to the froth blocker.

15. The froth flotation unit according to claim 1, wherein the froth blocker comprises individual circle arcs and discontinuation points between the arcs so that a fluid connection between the open froth subsurfaces is formed.

16. The froth flotation unit according to claim 1, wherein the froth blocker is a segment of the tank.

17. The froth flotation unit according to claim 16, wherein the froth blocker is a circle segment of the tank.

18. The froth flotation unit according to claim 16, wherein the froth blocker is arranged to be movable along a rotational axis so that the position of the first vertex may be changed in relation to center of the tank.

19. The froth flotation unit according to claim 18, wherein the rotational axis is parallel to a chord of the tank.

20. The froth flotation unit according to claim 1, wherein the gas supply is arranged into the tank.

21. The froth flotation unit according to claim 1, wherein the tank comprises a mixing device.

22. The froth flotation unit according to claim 21, wherein the mixing device comprises the gas supply.

23. The froth flotation unit according to claim 1, wherein the pulp area is at least 40 $m^2$, measured at the mixing area.

24. The froth flotation unit according to claim 1, wherein a distance between the first froth overflow lip of the first froth collection launder and the first side of the froth blocker or the second side of the froth blocker is at most 500 mm.

25. A flotation line comprising at least one froth flotation unit according to claim 1.

26. The flotation line according to claim 25, wherein a froth flotation unit is arranged into a downstream end of the flotation line.

27. The flotation line according to claim 25, wherein it comprises at least two conventional flotation units and/or at least two additional froth flotation units arranged to treat the slurry before it is arranged to be treated in the froth flotation unit.

28. A froth flotation unit for treating mineral ore particles suspended in slurry and for separating the slurry into an underflow and an overflow, the froth flotation unit comprising:

a tank with a center and a perimeter;

a gas supply for introducing flotation gas into the slurry to form froth; and a first froth collection launder comprising:

a first froth overflow lip facing towards the center of the tank;

a second froth collection launder arranged radially inward of the first froth collection launder, the second froth collection launder comprising a first froth overflow lip facing the perimeter of the tank; and a froth blocker arranged between the first froth overflow lip of the first froth collection launder and the first froth overflow lip of the second froth collection launder, the froth blocker being unsymmetrical with respect to a vertical axis extending therethrough, wherein an open froth surface of the tank is divided into a first open froth subsurface and a second open froth subsurface by the froth blocker, and wherein a ratio between an area of the first subsurface and an area of the second subsurface changes in response to vertical movement of the froth blocker relative to the first froth overflow lip.

29. A method of using the froth flotation line according to claim 25, wherein the method includes recovering mineral ore particles from the froth flotation line.

30. The method according to claim 29, wherein recovering mineral ore particles includes recovering mineral from low grade ore.

31. The method according to claim 30, wherein recovering mineral ore particles includes recovering copper from low grade ore.

32. A froth flotation method for treating mineral ore particles suspended in slurry, wherein the slurry is separated into an underflow and an overflow in a froth flotation unit according to claim 1, wherein the open froth surface of the tank is divided into two open froth subsurfaces by the froth blocker arranged between the first overflow lip of the first froth collection launder and the first overflow lip of the second froth collection launder.

33. The froth flotation method according to claim 32, wherein the two open froth subsurfaces are completely separated by the froth blocker.

34. The froth flotation method according to claim 32, wherein the two open froth subsurfaces are partially separated by the froth blocker and have a fluid connection.

35. The froth flotation method according to claim 32, wherein the area of the open froth surface is varied so that the relationship between the two open froth subsurfaces separated by the froth blocker is changed.

36. The froth flotation method according claim 32, wherein the relationship between the two open froth subsurfaces separated by the froth blocker is varied by changing the vertical position of the froth blocker in relation to the height of a froth overflow lip next to the froth blocker.

37. The froth flotation method according to claim 32, wherein the relationship between the two open froth subsurfaces separated by the froth blocker is varied by moving the position of the first vertex of the functional triangle in relation to a froth overflow lip next to the froth blocker.

38. The froth flotation method according to claim 32, wherein the relationship between the two open froth subsurfaces separated by the froth blocker is varied by moving the froth blocker vertically in relation to the height of a first froth overflow lip next to the froth blocker.

39. The froth flotation method according to claim 32, wherein the relationship between the two open froth subsurfaces separated by the froth blocker is varied by moving the position of the first vertex of the functional triangle in relation to the center of the tank.

40. The froth flotation method according to claim 32, wherein the froth blocker is arranged to be movable along a rotational axis so that the position of the first vertex may be changed in relation to the center of the tank.

* * * * *